US010698732B2

(12) United States Patent
Hassan

(10) Patent No.: US 10,698,732 B2
(45) Date of Patent: Jun. 30, 2020

(54) PAGE RANKING IN OPERATING SYSTEM VIRTUAL PAGES IN HYBRID MEMORY SYSTEMS

(71) Applicant: SAP SE, Walldorf (DE)

(72) Inventor: Ahmad Hassan, Belfast (IE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/213,654

(22) Filed: Jul. 19, 2016

(65) Prior Publication Data
US 2018/0024923 A1 Jan. 25, 2018

(51) Int. Cl.
*G06F 12/00* (2006.01)
*G06F 13/00* (2006.01)
*G06F 9/50* (2006.01)

(52) U.S. Cl.
CPC .................. *G06F 9/5016* (2013.01)

(58) Field of Classification Search
CPC ............ G06F 12/08; G06F 2212/1024; G06F 2212/152; G06F 2212/657; G06F 9/5016
USPC ......................................................... 711/203
See application file for complete search history.

(56) References Cited

U.S. PATENT DOCUMENTS

| 5,845,325 | A | 12/1998 | Loo |
| 6,157,955 | A | 12/2000 | Narad et al. |
| 6,195,731 | B1 * | 2/2001 | Bordaz .................. G06F 11/348 365/236 |
| 6,760,721 | B1 | 7/2004 | Chasen |
| 6,952,664 | B1 | 10/2005 | Lahiri et al. |
| 7,085,751 | B2 | 8/2006 | Finlay et al. |
| 7,181,578 | B1 | 2/2007 | Guha |
| 7,360,073 | B1 | 4/2008 | Billstrom et al. |
| 7,434,002 | B1 | 10/2008 | Zedlewski et al. |
| 7,624,381 | B1 | 11/2009 | Czajkowski et al. |
| 7,765,200 | B2 | 7/2010 | Kandil et al. |
| 7,774,556 | B2 | 8/2010 | Karamcheti et al. |
| 7,840,397 | B2 | 11/2010 | Chiou |
| 7,958,329 | B2 | 6/2011 | Holt |
| 8,170,859 | B1 | 5/2012 | Christensson et al. |
| 8,185,471 | B1 | 5/2012 | Walker et al. |
| 8,214,191 | B2 | 7/2012 | Ferren et al. |
| 8,230,395 | B1 | 7/2012 | Koh et al. |
| 8,456,905 | B2 | 6/2013 | Kasorla |
| 8,572,051 | B1 | 10/2013 | Chen et al. |
| 8,862,588 | B1 | 10/2014 | Gay |
| 8,868,537 | B1 | 10/2014 | Colgrove et al. |
| 8,874,846 | B2 | 10/2014 | Franceschini |
| 8,880,687 | B1 | 11/2014 | Chandrachari et al. |
| 8,959,611 | B1 | 2/2015 | Vincent |
| 8,966,462 | B2 | 2/2015 | Gounares et al. |

(Continued)

OTHER PUBLICATIONS

U.S. Appl. No. 14/704,461, filed May 5, 2015, Ahmad Hassan.

(Continued)

*Primary Examiner* — Sheng Jen Tsai
(74) *Attorney, Agent, or Firm* — Fish & Richardson P.C.

(57) ABSTRACT

Implementations of the present disclosure include methods, systems, and computer-readable storage mediums for determining that an object implicated in an executing application is to be allocated to memory in an in-memory system, determining a type of the object, and allocating the object to one of a first size of virtual memory page and a second size of virtual memory page of an operating system based on the type of the object.

20 Claims, 5 Drawing Sheets

(56) References Cited

U.S. PATENT DOCUMENTS

| | | | |
|---|---|---|---|
| 9,043,530 B1* | 5/2015 | Sundaram | G06F 3/068 |
| | | | 711/100 |
| 9,304,913 B2 | 4/2016 | Dong et al. | |
| 9,348,539 B1 | 5/2016 | Saxena | |
| 9,626,327 B2* | 4/2017 | Eilert | G06F 13/4247 |
| 9,652,380 B2* | 5/2017 | Byun | G06F 12/0246 |
| 9,672,158 B2 | 6/2017 | Karamcheti et al. | |
| 9,712,538 B1 | 7/2017 | Vincent et al. | |
| 9,720,925 B1 | 8/2017 | Lawson | |
| 9,720,967 B2 | 8/2017 | Lee et al. | |
| 9,740,438 B2 | 8/2017 | Hassan | |
| 9,841,914 B2* | 12/2017 | Hassan | G06F 3/0625 |
| 9,846,550 B2 | 12/2017 | Muralimanohar | |
| 1,008,318 A1 | 9/2018 | Hassan | |
| 2001/0027387 A1 | 10/2001 | Miyake et al. | |
| 2003/0033431 A1 | 2/2003 | Shinomiya | |
| 2003/0065648 A1 | 4/2003 | Driesch et al. | |
| 2004/0184340 A1 | 9/2004 | Dwarkasdas | |
| 2005/0097078 A1 | 5/2005 | Lohman et al. | |
| 2005/0108447 A1 | 5/2005 | Thadani | |
| 2006/0059474 A1* | 3/2006 | Bhansali | G06F 12/0276 |
| | | | 717/151 |
| 2006/0117299 A1 | 6/2006 | Goldsmith et al. | |
| 2006/0218123 A1 | 9/2006 | Chowdhuri et al. | |
| 2006/0218125 A1 | 9/2006 | Kandil et al. | |
| 2007/0050328 A1 | 3/2007 | Li | |
| 2007/0050609 A1 | 3/2007 | Ferren et al. | |
| 2007/0162425 A1 | 7/2007 | Betawadkar et al. | |
| 2007/0202473 A1 | 8/2007 | Koda | |
| 2007/0226186 A1 | 9/2007 | Ewen et al. | |
| 2008/0005476 A1 | 1/2008 | Venkatesan | |
| 2008/0034179 A1* | 2/2008 | Mewhinney | G06F 12/1036 |
| | | | 711/163 |
| 2008/0109592 A1 | 5/2008 | Karamcheti et al. | |
| 2008/0140682 A1* | 6/2008 | Grosset | G06F 17/30333 |
| 2008/0288718 A1* | 11/2008 | Hepkin | G06F 12/023 |
| | | | 711/104 |
| 2008/0288742 A1* | 11/2008 | Hepkin | G06F 12/1009 |
| | | | 711/201 |
| 2009/0024568 A1 | 1/2009 | Al-Omari et al. | |
| 2009/0049234 A1* | 2/2009 | Oh | G06F 12/0246 |
| | | | 711/103 |
| 2009/0157952 A1* | 6/2009 | Kim | G06F 12/0238 |
| | | | 711/103 |
| 2009/0157964 A1 | 6/2009 | Kasorla | |
| 2009/0182976 A1* | 7/2009 | Agesen | G06F 12/1009 |
| | | | 711/207 |
| 2009/0307462 A1 | 12/2009 | Fleming et al. | |
| 2010/0010799 A1 | 1/2010 | Altrichter | |
| 2010/0023800 A1* | 1/2010 | Harari | G06F 11/1068 |
| | | | 714/2 |
| 2010/0042999 A1 | 2/2010 | Dorai et al. | |
| 2010/0153631 A1* | 6/2010 | Moon | G06F 12/0246 |
| | | | 711/103 |
| 2010/0169602 A1 | 7/2010 | Hulbert et al. | |
| 2010/0262633 A1 | 10/2010 | Bhattacharjee et al. | |
| 2010/0287356 A1* | 11/2010 | Cameron | G06F 12/1027 |
| | | | 711/207 |
| 2010/0318718 A1* | 12/2010 | Eilert | G11C 13/0004 |
| | | | 711/103 |
| 2011/0066808 A1* | 3/2011 | Flynn | G06F 12/0246 |
| | | | 711/118 |
| 2011/0072006 A1 | 3/2011 | Yu et al. | |
| 2011/0078340 A1 | 3/2011 | Kim et al. | |
| 2011/0093654 A1 | 4/2011 | Roberts et al. | |
| 2011/0131199 A1 | 6/2011 | Simon et al. | |
| 2011/0271264 A1 | 11/2011 | Vorbach et al. | |
| 2011/0289126 A1 | 11/2011 | Aikas et al. | |
| 2011/0313999 A1 | 12/2011 | Bruno et al. | |
| 2012/0072744 A1 | 3/2012 | Jain et al. | |
| 2012/0089595 A1 | 4/2012 | Jaecksch | |
| 2012/0089803 A1* | 4/2012 | Dice | G06F 12/0223 |
| | | | 711/171 |
| 2012/0124318 A1 | 5/2012 | Bivens | |
| 2012/0144092 A1 | 6/2012 | Hsieh | |
| 2012/0151127 A1 | 6/2012 | Lim | |
| 2012/0151252 A1* | 6/2012 | Harris | G06F 11/141 |
| | | | 714/6.13 |
| 2012/0158799 A1 | 6/2012 | Morsi et al. | |
| 2012/0290768 A1* | 11/2012 | Rubowitz | G06F 12/0246 |
| | | | 711/103 |
| 2013/0013860 A1 | 1/2013 | Franceschini | |
| 2013/0074092 A1 | 3/2013 | Gounares et al. | |
| 2013/0080621 A1 | 3/2013 | Jain et al. | |
| 2013/0081005 A1 | 3/2013 | Gounares et al. | |
| 2013/0086309 A1 | 4/2013 | Lee | |
| 2013/0103380 A1 | 4/2013 | Brandstatter et al. | |
| 2013/0226903 A1 | 8/2013 | Wu et al. | |
| 2013/0246698 A1 | 9/2013 | Estan | |
| 2013/0275716 A1* | 10/2013 | Nishida | G06F 12/1027 |
| | | | 711/207 |
| 2013/0283250 A1 | 10/2013 | Eichenberger | |
| 2013/0326109 A1 | 12/2013 | Kivity | |
| 2014/0007043 A1 | 1/2014 | Aliseychik et al. | |
| 2014/0089564 A1* | 3/2014 | Liu | G06F 12/0246 |
| | | | 711/103 |
| 2014/0108723 A1 | 4/2014 | Nowoczynski | |
| 2014/0188870 A1* | 7/2014 | Borthakur | G06F 17/30312 |
| | | | 707/736 |
| 2014/0189204 A1 | 7/2014 | Sugimoto et al. | |
| 2014/0280685 A1 | 9/2014 | Magenheimer | |
| 2014/0281212 A1 | 9/2014 | Schreter et al. | |
| 2014/0281249 A1 | 9/2014 | Waldsperger | |
| 2014/0282455 A1 | 9/2014 | Felch | |
| 2014/0293801 A1 | 10/2014 | Dimou | |
| 2014/0310462 A1 | 10/2014 | Waldspurger et al. | |
| 2014/0351411 A1 | 11/2014 | Woods et al. | |
| 2014/0372428 A1 | 12/2014 | Mathis et al. | |
| 2015/0012465 A1 | 1/2015 | Pingenot | |
| 2015/0062736 A1 | 3/2015 | Kim et al. | |
| 2015/0077426 A1* | 3/2015 | Kweon | G06T 1/60 |
| | | | 345/557 |
| 2015/0081300 A1 | 3/2015 | Kim | |
| 2015/0089604 A1 | 3/2015 | Mathew | |
| 2015/0106582 A1* | 4/2015 | Mai | G06F 3/0649 |
| | | | 711/165 |
| 2015/0154087 A1 | 6/2015 | Jin et al. | |
| 2015/0169226 A1 | 6/2015 | Shen et al. | |
| 2015/0199126 A1 | 7/2015 | Jayasena | |
| 2015/0206574 A1 | 7/2015 | Greathouse | |
| 2015/0309789 A1 | 10/2015 | Thorat | |
| 2015/0363319 A1 | 12/2015 | Qi | |
| 2015/0370560 A1 | 12/2015 | Tan | |
| 2015/0378169 A1 | 12/2015 | Naeimi | |
| 2016/0019132 A1 | 1/2016 | Vilakkunnadathil | |
| 2016/0117241 A1 | 4/2016 | Shah et al. | |
| 2016/0117258 A1 | 4/2016 | Karamcheti et al. | |
| 2016/0125927 A1 | 5/2016 | Wei | |
| 2016/0150003 A1 | 5/2016 | Magdon-Ismall | |
| 2016/0179685 A1* | 6/2016 | Byun | G06F 12/08 |
| | | | 711/118 |
| 2016/0188217 A1 | 6/2016 | Golander et al. | |
| 2016/0196112 A1 | 7/2016 | Edwards et al. | |
| 2016/0196324 A1 | 7/2016 | Haviv et al. | |
| 2016/0005423 A1 | 8/2016 | Neppalli et al. | |
| 2016/0205174 A1 | 8/2016 | Pitio et al. | |
| 2016/0253093 A1 | 9/2016 | Zhang | |
| 2016/0283393 A1 | 9/2016 | Kawaba | |
| 2016/0321048 A1 | 11/2016 | Matsuura | |
| 2016/0328169 A1* | 11/2016 | Hassan | G06F 3/0625 |
| 2016/0336069 A1 | 11/2016 | Lin | |
| 2016/0378169 A1 | 12/2016 | Naeimi | |
| 2016/0378977 A1 | 12/2016 | Alme et al. | |
| 2017/0010817 A1 | 1/2017 | Lim | |
| 2017/0010952 A1 | 1/2017 | Nandakumar et al. | |
| 2017/0052741 A1* | 2/2017 | Hassan | G06F 3/0685 |
| 2017/0052742 A1* | 2/2017 | Hassan | G06F 12/0284 |
| 2017/0060740 A1 | 3/2017 | Doerner | |
| 2017/0090776 A1* | 3/2017 | Kowles | G06F 3/0608 |
| 2017/0091334 A1 | 3/2017 | Kabiljo et al. | |
| 2017/0115892 A1 | 4/2017 | Gokita | |
| 2017/0116210 A1 | 4/2017 | Park et al. | |

(56) References Cited

U.S. PATENT DOCUMENTS

| | | |
|---|---|---|
| 2017/0147516 A1 | 5/2017 | De |
| 2017/0154136 A1 | 6/2017 | Eckmann et al. |
| 2017/0160955 A1 | 6/2017 | Jayasena |
| 2017/0161198 A1 | 6/2017 | Trika |
| 2017/0193136 A1 | 7/2017 | Prasad et al. |
| 2017/0206010 A1 | 7/2017 | Nachimuthu |
| 2017/0206172 A1 | 7/2017 | Ma |
| 2017/0212843 A1* | 7/2017 | Agesen ............... G06F 12/1009 |
| 2017/0220256 A1 | 8/2017 | Balasubramonian |
| 2017/0220257 A1 | 8/2017 | Balasubramonian |
| 2017/0220488 A1 | 8/2017 | Balasubramonian |
| 2017/0220516 A1* | 8/2017 | Eilert .................. G06F 13/4247 711/117 |
| 2017/0223046 A1 | 8/2017 | Singh |
| 2017/0242595 A1 | 8/2017 | Niu |
| 2017/0255674 A1 | 9/2017 | Attaluri et al. |
| 2017/0289000 A1 | 10/2017 | Park et al. |
| 2017/0301386 A1* | 10/2017 | Parks ....................... G06F 3/064 |
| 2017/0352012 A1 | 12/2017 | Hearn et al. |
| 2018/0024750 A1 | 1/2018 | Hassan |
| 2018/0024754 A1 | 1/2018 | Hassan |
| 2018/0024755 A1 | 1/2018 | Hassan |
| 2018/0024821 A1 | 1/2018 | Hassan |
| 2018/0024913 A1 | 1/2018 | Hassan |
| 2018/0024922 A1 | 1/2018 | Hassan |
| 2018/0024928 A1 | 1/2018 | Hassan |
| 2018/0024997 A1 | 1/2018 | Hassan |
| 2018/0025016 A1 | 1/2018 | Hassan |
| 2018/0025055 A1 | 1/2018 | Hassan |
| 2018/0025904 A1 | 1/2018 | Hassan |
| 2019/0057131 A1 | 2/2019 | Hassan |

OTHER PUBLICATIONS

U.S. Appl. No. 14/831,567, filed Aug. 20, 2015, Ahmad Hassan.
U.S. Appl. No. 14/831,624, filed Aug. 20, 2015, Ahmad Hassan.
Luk et al., "Pin Building Customized Program Analysis Tools with Dynamic Instrumentation,"ACM Sigplan Notices, Jun. 2005, 40(6) 190-200.
U.S. Office Action in related U.S. Appl. No. 15/213,621 dated May 17, 2018, 11 pages.
U.S. Office Action in related U.S. Appl. No. 15/213,621 dated Dec. 13, 2018, 12 pages.
U.S. Office Action in related U.S. Appl. No. 15/213,754 dated Feb. 27, 2018, 23 pages.
U.S. Office Action in related U.S. Appl. No. 15/213,754 dated Jun. 20, 2018, 22 pages.
U.S. Office Action in related U.S. Appl. No. 15/213,754 dated Sep. 11, 2018, 22 pages.
U.S. Office Action in related U.S. Appl. No. 15/213,816 dated Jul. 26, 2018, 27 pages.
U.S. Office Action in related U.S. Appl. No. 15/213,930 dated Mar. 9, 2018, 20 pages.
U.S. Office Action in related U.S. Appl. No. 15/213,930 dated Jun. 19, 2018, 20 pages.
U.S. Office Action in related U.S. Appl. No. 15/213,930 dated Oct. 20, 2018, 23 pages.
U.S. Office Action in related U.S. Appl. No. 15/213,960 dated Jul. 12, 2018, 24 pages.
U.S. Office Action in related U.S. Appl. No. 15/213,960 dated Dec. 13, 2018, 22 pages.
U.S. Office Action in related U.S. Appl. No. 15/214,019 dated Jun. 14, 2018, 10 pages.
U.S. Office Action in related U.S. Appl. No. 15/214,019 dated Aug. 27, 2018, 8 pages.
U.S. Office Action in related U.S. Appl. No. 15/214,082 dated Aug. 27, 2018, 27 pages.
U.S. Office Action in related U.S. Appl. No. 15/214,102 dated Jul. 24, 2018, 33 pages.
U.S. Office Action in related U.S. Appl. No. 15/213,754 dated Jan. 29, 2019, 29 pages.
U.S. Office Action in related U.S. Appl. No. 15/213,816 dated Feb. 7, 2019, 27 pages.
U.S. Office Action in related U.S. Appl. No. 15/214,102 dated Feb. 6, 2019, 34 pages.
U.S. Office Action in related U.S. Appl. No. 15/213,754 dated May 23, 2019, 32 pages.
U.S. Office Action in related U.S. Appl. No. 15/214,082 dated Mar. 8, 2019, 41 pages.
U.S. Office Action in related U.S. Appl. No. 15/213,930 dated Feb. 26, 2019, 35 pages.
U.S. Office Action in related U.S. Appl. No. 15/213,626 dated Apr. 12, 2019, 23 pages.
Chen et al., ""FSRAM: Flexible Sequential and Random AccessMemory for Embedded Systems"" Laboratory for Advanced Research in Computing Technology and Compilers Technical Report No. ARCTiC, Mar. 1, 2004, 6 pages.
Dulloor et al., ""Data tiering in heterogeneous memory systems"" Proceedings of the Eleventh European Conference onComputer Systems, ACM, Apr. 18, 2016, 16 pages.
Ouyang et al., ""SSD-Assisted Hybrid Memory to Accelerate Menncached over High Performance Networks"" 2012 41stInternational Conference on Parallel Processing, IEEE, Sep. 10, 2012, 10 pages.
Wang et al., ""NVMalloc: Exposing an Aggregate SSD Store as a Memory Partition in Extreme-Scale Machines"" 2012 IEEE 26thInternational Parallel and Distributed Processing Symposium, May 21, 2012, 12 pages.
Zakai, "Emscripten: An LLVM-to-JavaScript Compiler," Proceedings of the ACM international conference companion on Object oriented programming systems languages and applications companion (OOPSLA), Portland, Oregon, Oct. 22-27, 2011, 12 pages.
U.S. Appl. No. 15/213,621, filed Jul. 19, 2016, Ahmad Hassan.
U.S. Appl. No. 15/213,626, filed Jul. 19, 2016, Ahmad Hassan.
U.S. Appl. No. 15/213,674, filed Jul. 19, 2016, Ahmad Hassan.
U.S. Appl. No. 15/213,754, filed Jul. 19, 2016, Ahmad Hassan.
U.S. Appl. No. 15/213,816, filed Jul. 19, 2016, Ahmad Hassan.
U.S. Appl. No. 15/213,861, filed Jul. 19, 2016, Ahmad Hassan.
U.S. Appl. No. 15/213,930, filed Jul. 19, 2016, Ahmad Hassan.
U.S. Appl. No. 15/213,960, filed Jul. 19, 2016, Ahmad Hassan.
U.S. Appl. No. 15/214,019, filed Jul. 19, 2016, Ahmad Hassan.
U.S. Appl. No. 15/214,082, filed Jul. 19, 2016, Ahmad Hassan.
U.S. Appl. No. 15/214,102, filed Jul. 19, 2016, Ahmad Hassan.
U.S. Appl. No. 15/677,700, filed Aug. 15, 2017, Ahmad Hassan.
Dhiman et al., "PDRAM: A hybrid PRAM and DRAM main memory system," Proceedings of the 46th Annual Design Automation Conference, Jul. 26-31, 2009, pp. 664-669.
Hassan et al., "Energy-Efficient In-Memory Data Stores on Hybrid Memory Hierarchies," Eleventh International Workshop on Dada Management on New Hardware, Jun. 2015, last retrieved from https://event.cwi.nl/damon2015/slides/slides-hassan.pdf on Jan. 5, 2018.
Hassan et al., "Analytical models and techniques for Software-Managed Energy-Efficient Hybrid DRAM/NVM Main Memory," AMC International Conference on Computing Frontiers 2015, May 18-21, 2015.
Hu et al., "Data allocation optimization for hybrid scratch pad memory with sram and nonvolatile memory," IEEE Transactions on Very Large Scale Integration (VLSI) Systems, Jun. 2013, 21(6): 1094-1102.
Li et al., "Assert(!Defined(Sequential I/O))," Proceedings of the 6th USENIX Conference on Hot Topics in Storage and File Systems, Jun. 17-18, 2014, 1-5.
Mogul et al., "Operating system support for NVM+DRAM hybrid main memory," Proceedings of teh 12th Conference on Hot Topics in Operating Systems, May 18-20, 2009, 1-5.
Ramos et al., "Page placement in hybrid memory systems," Proceedings of the International Conference on Supercomputing, May 31-Jun. 4, 2011.
Wang et al., "Optimized Allocation of Data Variables to PCM/DRAM-based Hybrid Main Memory for Real-Time Embedded Systems," Embedded Systems Letters, IEEE, Sep. 2014, 6(3):61-64.
USPTO Office Action in related U.S. Appl. No. 15/214,019 dated Dec. 22, 2017; 12 pages.

(56) References Cited

OTHER PUBLICATIONS

USPTO Office Action in related U.S. Appl. No. 15/213,960 dated Jan. 11, 2018; 22 pages.
U.S. Office Action in related U.S. Appl. No. 15/213,816 dated Jun. 18, 2019, 46 pages.
Final office action issued in U.S. Appl. No. 15/213,626 dated Oct. 18, 2019, 41 pages.
Final office action issued in U.S. Appl. No. 15/213,674 dated Oct. 18, 2019, 43 pages.
Final office action issued in U.S. Appl. No. 15/213,816 dated Jan. 2, 2020, 43 pages.
Non-final office action issued in U.S. Appl. No. 15/213,674 dated Jan. 30, 2020, 38 pages.
Non-final office action issued in U.S. Appl. No. 15/214,082 dated Sep. 6, 2019, 36 pages.
Non-final office action issued in U.S. Appl. No. 15/677,700 dated Nov. 18, 2019, 60 pages.

* cited by examiner

US 10,698,732 B2

PAGE RANKING IN OPERATING SYSTEM VIRTUAL PAGES IN HYBRID MEMORY SYSTEMS

BACKGROUND

Enterprises, such as business enterprises, operate enterprise systems to provide software functionality to customers and employees. In some examples, an enterprise system can include back-end enterprise servers that host enterprise applications. Example enterprise applications include enterprise resource planning (ERP) systems, client-relationship management (CRM) systems, product lifecycle management (PLM) systems, supply chain management (SCM) systems, and supplier relationship management (SRM) systems. During operation of an enterprise application, application data is accessed, which is stored in main memory of the enterprise server. In this manner, the application data is immediately accessible by processors of the enterprise server.

Increasingly large amounts of application data are stored in the main memory of enterprise servers. Main memory can include dynamic random access memory (DRAM), which consumes a relatively high amount of static energy (both in active and idle states) due to continuous leakage and refresh power. Storage class memory (SCM) (e.g., phase change memory (PCM)) can address fundamental limitations of DRAM. Characteristics that differentiate SCM from DRAM include data persistence, high latency, high write energy, low static energy and low write endurance (e.g., wear-out of cells). Physically, SCM is inserted into a memory bus along with DRAM.

SUMMARY

Implementations of the present disclosure include computer-implemented methods for object-level data management in hybrid memory systems. In some implementations, methods include actions of determining that an object implicated in an executing application is to be allocated to memory in an in-memory system, determining a type of the object, and allocating the object to one of a first size of virtual memory page and a second size of virtual memory page of an operating system based on the type of the object.

These and other implementations can each optionally include one or more of the following features: the type of the object includes a hot object, and is allocated to the first size of virtual memory page, the first size of virtual memory page includes a large virtual memory page; actions further include allocating hot objects to the large virtual memory page until the large virtual memory page is full, then allocating hot objects to another large virtual memory page; the type of the object includes a cold object, and is allocated to the second size type of virtual memory page, the second size of virtual memory page including a small virtual memory page; actions further include determining the type of the object includes calculating an average memory access time (AMAT) of the object, and comparing the AMAT to a threshold; the application includes a first allocator function and a second allocator function to respectively allocate the object to one of the first size of virtual memory page and the second size of virtual memory page of the operating system based on the type of the object; and actions further include: receiving source code of the application, providing an instrumented application that includes the source code and instrumentation code, the instrumented application including at least one instruction for profiling a plurality of objects, executing the instrumented application to process a set of benchmark queries to provide a statistics file, the statistics file indicating, for each object in the plurality of object, respective memory allocations, and for each object in the plurality of objects, determining a respective type based on the respective memory allocations.

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
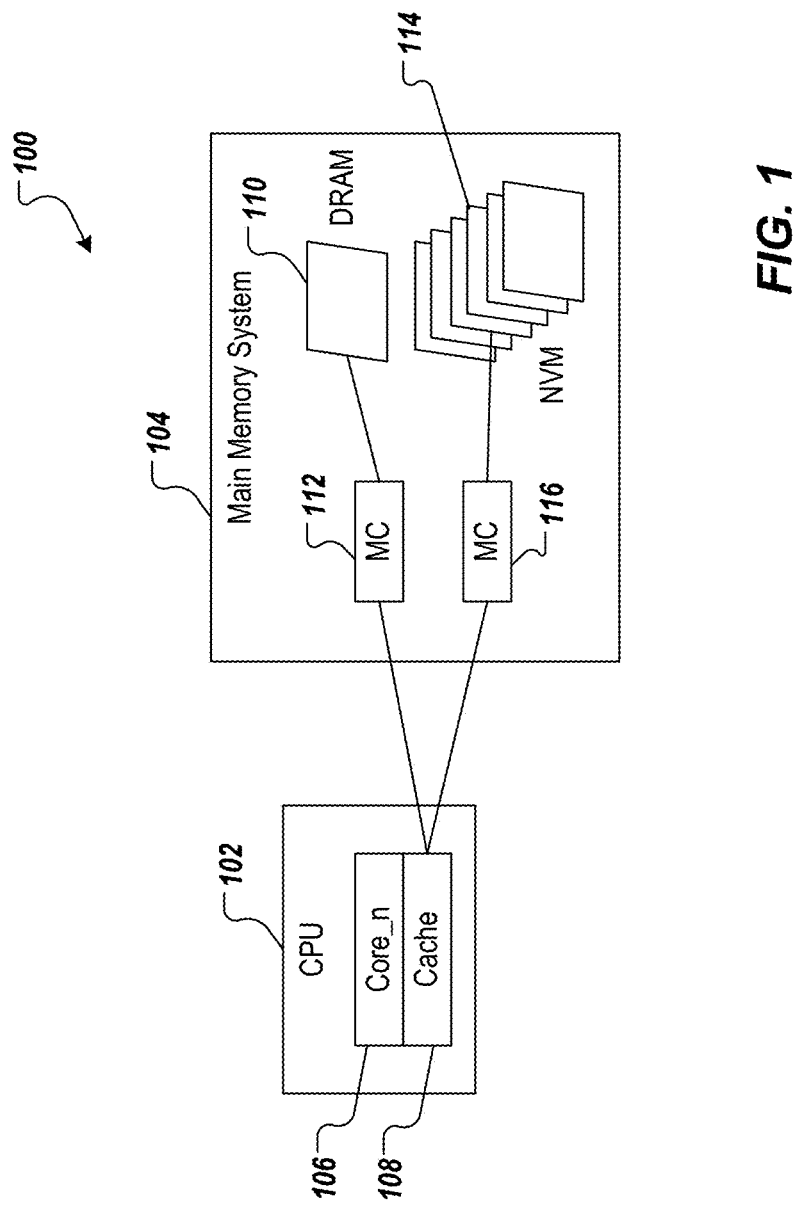
FIG. 1 depicts an example hybrid main memory architecture in accordance with implementations of the present disclosure.

Implementations of the present disclosure are generally directed to object-level data management in hybrid memory systems. More particularly, implementations of the present disclosure are directed to selectively allocating objects to large virtual memory pages (large pages), or small virtual memory pages (small pages) based on types of objects. In some examples, implementations also include co-locating particular types of objects in large pages. As described in further detail herein, implementations of the present disclosure reduce buffer misses for in-memory workloads, and improve cache locality of application objects.

DRAM scaling has been used to address management of application data in main memory of enterprise servers. However, the ability of DRAM to scale below 22 nm feature sizes is yet to be confirmed. Further, with non-negligible leakage power and relatively high refresh power, DRAM can consume 30-40% of the total server power. The DRAM size directly influences the power consumption of the servers.

As there are limits to DRAM scaling, storage class memory (SCM), such as byte-addressable non-volatile memory (NVM) (e.g., phase change memory (PCM), spin transfer torque memory (STT-RAM)), is considered for use in main memory replacement. NVM, however, has certain disadvantages, which can vary between NVM technologies. Generally, various NVM technologies have been proposed over recent years, each with different strengths and weaknesses in energy, performance, durability, density and scalability, and each with different likelihoods of making it to mass production. The main contenders are PCM, STT-RAM, and memristors. These technologies are byte-addressable and exhibit low leakage power and zero refresh power. As such, NVM is promising to augment DRAM in main memory. However, NVM has weaknesses. For example, reading and writing often takes longer than for DRAM, and consumes more energy, with writing suffering more than reading. There is an asymmetry in read and write cost (e.g., PCM read and write latency is approximately 4.4× and 12× times DRAM latency). Similarly, dynamic energy of PCM read and write is approximately 2× and 43× of DRAM, respectively.

Hybrid main memory, including multiple types of memory (e.g., DRAM, NVM), is implemented to address the disadvantages of NVM. Generally, the concept behind hybrid main memory is that a small amount of DRAM holds frequently accessed data (hot data) and provides low latency and low dynamic energy, while a large amount of SCM is used to implement a scalable memory system and store the majority of less frequently accessed data (cold data). A challenge is how to manage data on a hybrid DRAM/NVM memory system. For example, such systems should rarely expose the high latency and dynamic energy of NVM, while using NVM to increase the capacity of main memory.

Accordingly, and as described in further detail herein, implementations of the present disclosure address such challenges by proposing data management policies at the level of application objects. Implementations of the present disclosure are more energy-efficient than traditional approaches. For example, some traditional approaches propose various hybrid memory solutions that are operated by the hardware or the operating system (OS). Such solutions try to second-guess the properties of the workloads and migrate large chunks of data between DRAM and NVM at the page level of the virtual memory system. This introduces runtime overhead and energy consumption (e.g., due to the monitoring and the migration), which are reduced or eliminated by implementations of the present disclosure.

FIG. 1 depicts an example memory architecture 100 that can be implemented within an enterprise server, for example. In the example of FIG. 1, the example memory architecture 100 includes a central processing unit (CPU) 102 and a main memory system 104. The CPU 102 includes a core 106 having a respective cache 108. Although a single core and respective cache 108 is depicted, it is appreciated that the CPU 102 can include multiple cores, each with a respective cache. Further, although a single CPU 102 is depicted, it is appreciated that enterprise servers can include multiple CPUs. The main memory system 104 includes DRAM 110 with a respective memory controller (MC) 112, and NVM 114 with a respective MC 116. In some examples, the cache 108 accesses (e.g., read, write, delete) the DRAM 110 through the MC 112, and accesses (e.g., read, write, delete) the NVM 114 through the MC 114.

In some examples, the example memory architecture 100 can be implemented in an in-memory database system. In some examples, an in-memory database system is a database management system that uses main memory for data storage. In some examples, main memory includes random access memory (RAM) that communicates with one or more processors (e.g., central processing units (CPUs)), over a memory bus. An in-memory database system can be contrasted with database management systems that employ a disk storage mechanism. In some examples, in-memory database systems are faster than disk storage databases, because internal optimization algorithms can be simpler and execute fewer CPU instructions. In some examples, accessing data in an in-memory database system eliminates seek time when querying the data, which provides faster and more predictable performance than disk-storage databases. In some examples, an in-memory database can be provided as a column-oriented in-memory database, in which data tables are stored as sections of columns of data (rather than as rows of data). An example in-memory database system includes HANA, provided by SAP SE of Walldorf, Germany.

Figure 2:
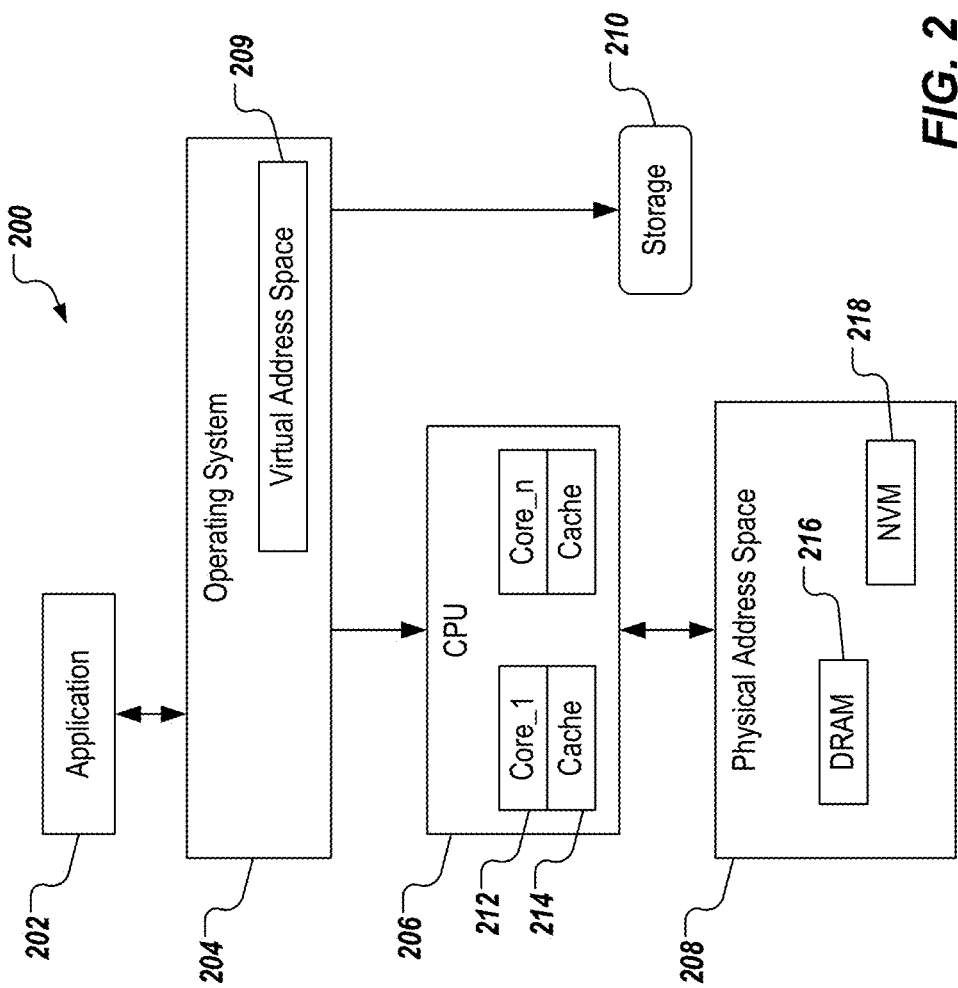
FIG. 2 depicts an example architecture in accordance with implementations of the present disclosure.

FIG. 2 depicts an example architecture 200 for storing data in accordance with implementations of the present disclosure. In the depicted example, the example architecture 200 includes an application 202, an OS 204, a CPU 206, a physical address space 208, a virtual address space 209, and storage 210. In some examples, execution of the application 202 is coordinated by the OS 204. The CPU 206 includes a plurality of cores 212 (Core_1, . . . , Core_n) with respective caches 214 (e.g., last-level cache (LLC)). In some examples, the CPU 206 coordinates read/write access to the physical address space 208, which is provided as a hybrid main memory (e.g., the main memory system 104 of FIG. 1), described herein. Accordingly, the physical address space 208 includes DRAM 216 and NVM 218 (e.g., for storing hot objects and cold objects, respectively).

In some examples, the application 202 is the application, for which data allocations between the DRAM 216 and NVM 218 are to be made. In some examples, the virtual address space 209 is provided as a set of binary addresses that is used by the operating system 204 to allocate memory addresses to any process requesting the memory. In some examples, the virtual address space 209 enables the processes to use more memory addresses than the actual DRAM memory available in the system. In some implementations, the operating system 204 manages the mappings between virtual addresses and physical addresses. In some examples, the storage 210 is provided as hard disk drive that is used for permanent storage of data.

As introduced above, implementations of the present disclosure are directed to object-level data management in hybrid memory systems. It has been shown that operating on objects leads to higher energy savings. For example, the cumulative distribution function of the difference in energy consumed for a 4 KB page when it is stored on DRAM in comparison to storing a 4 KB page on NVM reveals that 61% of pages incur no extra energy, while around 8% of pages are hot pages, incurring extra energy. Accordingly, approximately 31% of pages are in a gray zone, in which the energy difference for storing pages falls off. It has also been shown that approximately 91% of objects are cold, and incur no added energy, while approximately 9% of objects are hot. In view of this, objects provide an improved granularity to determine placement in a hybrid memory architecture.

An example OS virtual page management scheme for page migration on hybrid memory systems (e.g., DRAM/NVM) includes a rank-based page placement (RaPP) policy for page migrations between NVM and DRAM. In some examples, RaPP uses multi-level queues to rank pages according to page access frequency, where pages are first placed on NVM, and transition between multi-level queues as they are accessed. When a rank of a given page reaches a threshold, the migration is triggered to place that page on DRAM. Similarly, if the rank of a page falls below the threshold, the migration policy moves the page from DRAM to NVM. In some examples, RaPP relies on a customized memory controller to collect page access frequency, where an OS keeps record of page access information, collected from the memory controller, to run the ranking for page placement. Pages with higher access frequency are placed on DRAM, which improves the performance and reduces the wear on NVM cells.

It has been shown, however, that RaPP does not perform well, because of good cache locality of data accessed by database algorithms. For example, the ranking algorithm in RaPP requires a relatively large number of main memory accesses to the pages (e.g., cache misses) in order to rank pages appropriately within multi-level queues. If there are not enough accesses going to a certain page (e.g., due to no accesses to that data, or accesses mainly going to the caches), then RaPP can inaccurately predict the most energy efficient placement of a page in hybrid memory systems. It has also been shown that the rate of cache misses (e.g., translation lookup buffer (TLB) misses) is relatively high when using 4 KB pages in RaPP for in-memory databases. A cache miss occurs when a requested virtual memory address is not in the cache.

Implementations of the present disclosure are based on an in-depth analysis of a page ranking algorithm and workload behavior under a variety of workloads. Example observations of this analysis include: in-memory databases have relatively good cache locality, and as a consequence, OS pages do not incur enough main memory access in order to accurately distinguish between hot data and cold data; a single page has a relatively small percentage of hot objects, and a relatively large percentage of cold objects; and main memory read and write access on different objects are scattered across many pages, which results in higher cache misses, because more pages need to brought back in to main memory.

In view of at least the above example observations, implementations of the present disclosure reduce cache misses for in-memory workloads, and improve the cache locality of application objects. More particularly, implementations of the present disclosure provide large pages (e.g., Linux Huge Pages) to place more objects within a single page. For example, instead of using a standard sized page (e.g., 4 KB page), implementations of the present disclosure provide a large page (e.g., 2 MB page). In some implementations, and as described in further detail herein, large pages are used concurrently with standard sized pages.

Further, implementations of the present disclosure provide a tool to measure read and write main memory accesses for each object. Based on these measurement, implementations of the present disclosure co-locate hot objects within the same page, and cold objects reside on separate pages. In some examples, this co-location of hot objects improves the cache locality, because when a large page (e.g., 2 MB page) is loaded into memory, the large page provides all relevant hot objects to the memory at the same time. In some examples, this also reduces the number of page faults, because a large page will contain most of the requested hot objects.

Moreover, large pages reduce the demand on the cache (e.g., TLB). In some examples, the number of virtual-to-physical address translations within the cache are significantly reduced based on the large pages. For example, large pages result in more read and write access to single page, which allows the page ranking algorithms to rank pages more accurately. In this manner (e.g., by introducing large pages, and co-locating hot objects into a large page), implementations of the present disclosure provide improvements in energy savings and performance. It has been shown that implementations of the present disclosure provide 43% more energy savings for a large page (e.g., 2 MB page) for an in-memory database running a benchmark workload. An example benchmark workload includes queries provided in the TPC Benchmark H (TPC-H) provided by the Transaction Processing Performance Council of San Francisco, Calif.). In some examples, implementations of the present disclosure reduce cache misses by approximately 39% percent.

In some implementations, a profiling tool is used to provide a statistics file indicating metrics of the application. More specifically, a pass (e.g., an LLVM pass), and a memory profiling library (MPL) are used to profile execution of an instrumented application. In some examples, a set of benchmark queries are executed by the instrumented application, and the statistics file is provided based thereon. Example benchmark queries include queries provided in the TPC-H, which is a decision support benchmark that includes a set of business oriented ad-hoc queries (e.g., a set of benchmark queries), and concurrent data modifications. The TPC-H is described as being representative of decision support systems that examine large volumes of data, execute queries with a high degree of complexity, and provide answers to critical business questions.

In further detail, the pass receives application source code (e.g., source code of the application that is to be profiled, and provides executable code. In some examples, the pass compiles the source code and adds instrumentation code to provide the executable code. In some examples, the instrumentation code includes instructions to profile the application during execution (e.g., objects, sizes, loads/stores of allocations). In some examples, the executable code is provided as bit-code (e.g., human-readable) and is executed by the MPL to provide the statistics file. In some examples, the statistics file provides an inventory of all objects implicated by the application, sizes of the respective objects, and includes a count of all loads/stores of memory allocations, as well as a mapping of each load/store to a respective object.

In accordance with implementations of the present disclosure, the statistics file is processed to identify objects as either hot objects (e.g., frequently accessed objects) or cold objects (e.g., less frequently accessed objects). In some implementations, identifying an object as a hot object or a cold object is performed based on an average memory access time (AMAT) of the object. In some examples, the AMAT incurred by memory accesses to one object o stored in a memory of technology $\tau$ is given by $AMAT_\tau(o)$ based on the following example relationship:

$$AMAT_\tau(o) = \mu_r(o) L_{\tau,r} + (1 - \mu_r(o)) L_{LLC} \qquad (1)$$

where $\tau$ is either DRAM or NVM, $L_{\tau,r}$ is the latency to read a cache block in memory, $L_{LLC}$ is the latency to access the last-level cache (LLC), $\mu_r(o)$ is the number of read memory accesses made to o per load or store operation. The example relationship (1) addresses a single-level cache, but can be extended to address multi-level caches.

In some implementations, an object is identified as either a hot object or a cold object based on a comparison of the respective AMAT determined for the object (e.g., based on metrics recorded in the statistics file) to a threshold. In some examples, if the AMAT of an object exceeds the threshold, the object is identified as a hot object, and if the AMAT of an object does not exceed the threshold, the object is identified as a cold object. In some implementations, a list of objects and their respective identifications (as either hot or cold) is stored in memory for use during subsequent execution of queries.

Figure 3:
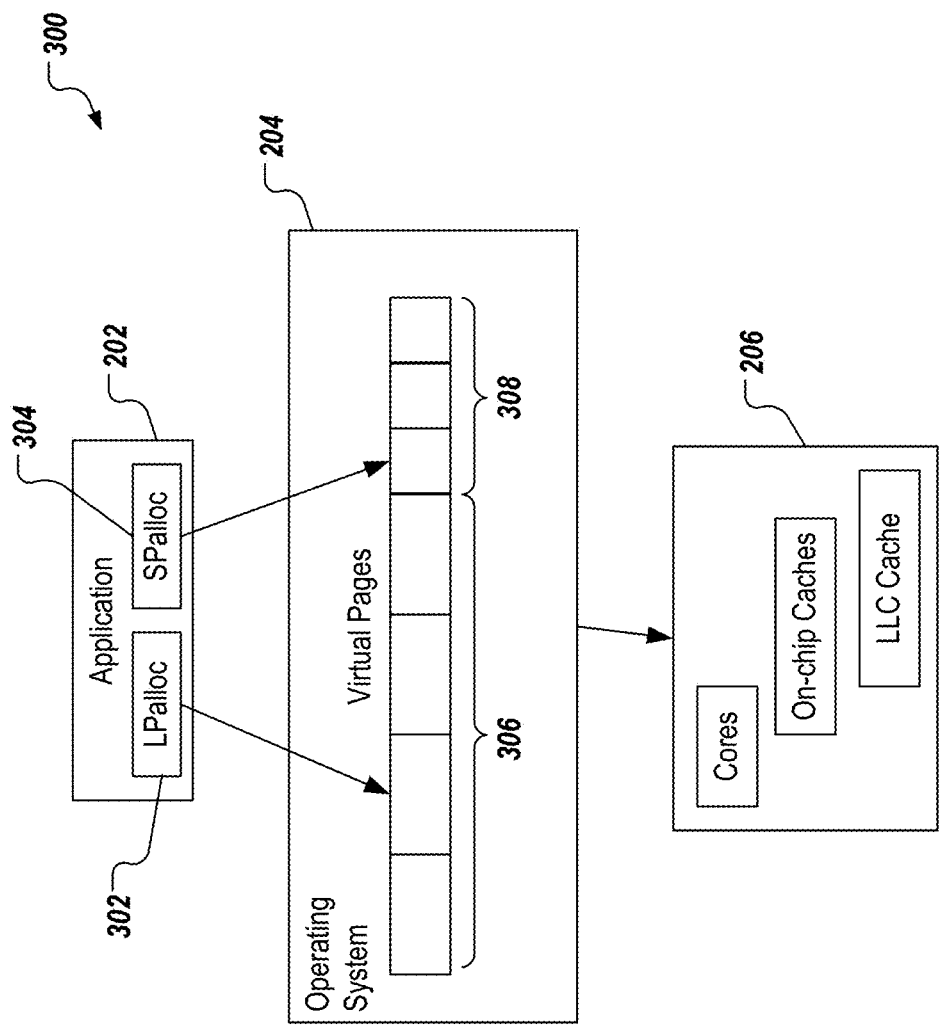
FIG. 3 depicts a portion of the example architecture of FIG. 2 in further detail.

An example execution of an application to place objects on respective pages will be described with reference to FIG. 3. FIG. 3 depicts a portion 300 of the example architecture 300 of FIG. 2 in further detail. In the depicted example, the application 202 (which had been profiled, as described above) executes in a production environment, and includes a plurality of memory allocators to allocate objects to different-sized virtual pages of the OS 204. More particularly, the application 202 includes a large memory allocator (LPalloc) 302, and a small memory allocator (SPalloc) 304, that respectively allocate objects to large pages 306 (e.g., 2 MB) and small pages 308 (e.g., 4 KB) during execution of the application 202. For example, if the application 202 is to allocate an object, the application 202 determines whether the object is a hot object or a cold object (e.g., from the list of objects stored in memory). If the object is a hot object, the application 202 uses the LPalloc 302 to allocate the object to a large page 306, and if the object is a cold object, the application 202 uses the SPalloc 304 to allocate the object to a small page 308. In some examples, the application 202 allocates hot objects to the same large page 306 until the page is full. In this manner, as many hot objects are co-located to the same large page 306 as can be.

Figure 4:
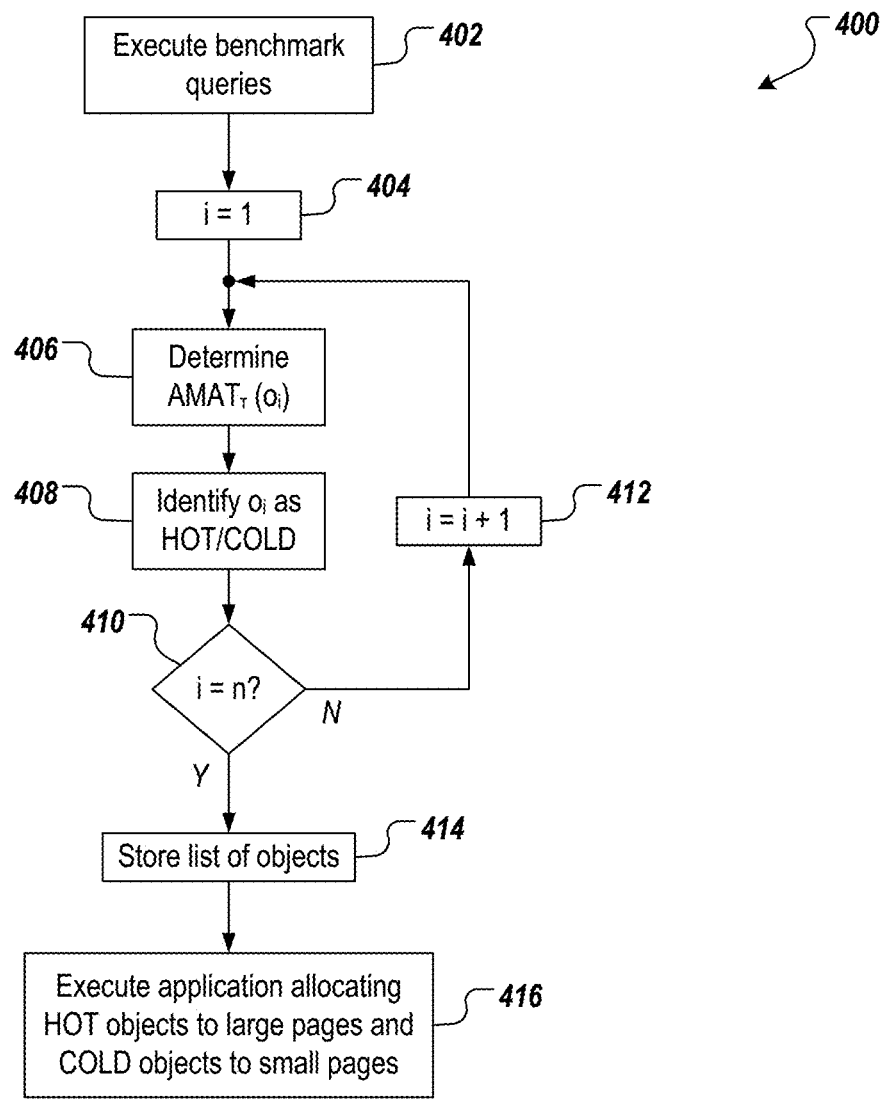
FIG. 4 depicts an example process that can be executed in accordance with implementations of the present disclosure.

FIG. 4 depicts an example process 400 that can be executed in accordance with implementations of the present disclosure. In some implementations, the example process 400 can be realized using one or more computer-executable programs executed using one or more computing devices.

A set of benchmark queries are executed to provide a statistics file (402). For example, an instrumented application is used to execute the set of benchmark queries (e.g., TPC-H), and a statistics file is provided (as described above). In some examples, the statistics file provides statistics for a plurality of object $o_1, \ldots, o_n$ implicated in execution of the set of benchmark queries. In some examples, the statistics file provides, for each object, a number of main memory reads and a number of main memory writes. A counter i is set equal to 1 (404). $AMAT_\tau$ (o) is determined for an object $o_i$ (406). For example, and as described above, $AMAT_\tau(o)$ is determined using the example relationship (1) provided above. The object $o_i$ is identified as either a hot object or a cold object based on the respective $AMAT_\tau(o)$ (408). For example, $AMAT_\tau(o)$ is compared to a threshold, as described above. It is determined whether i is equal to n (410). In other words, it is determined whether all objects (e.g., $o_1, \ldots, o_n$) have identified as either hot or cold. If i is not equal to n, i is incremented (412), and the process 400 loops back to process the next page.

If i is equal to n, a list of objects and their respective identification (e.g., hot, cold) is stored (414). The application is executed (416). For example, the application, which had been instrumented to provide the instrumented application used to provide the statistics file, is used in production, for example, to run one or more queries over data stored in an in-memory database. During execution, if the application is to allocate an object to a virtual memory page, the application determines whether the object is a hot object or a cold object, and allocate the object to a large page, or a small page, respectively.

Figure 5:
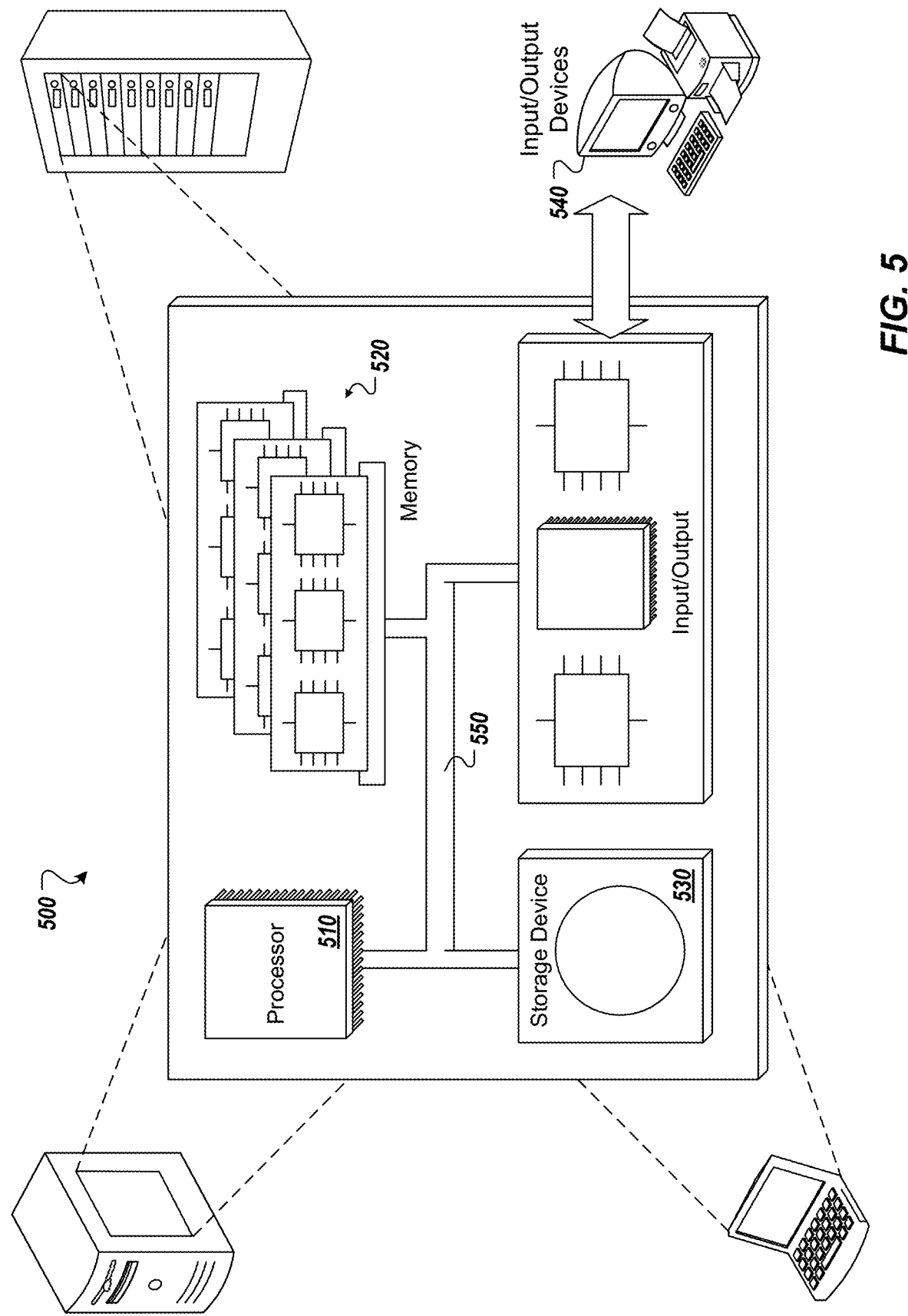
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. Each of the components 510, 520, 530, 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device) for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method executed by one or more processors, the method comprising:
   determining, by the one or more processors, that an object implicated in an executing application is to be allocated to memory in an in-memory system;
   determining, by the one or more processors, an average memory access time (AMAT) of the object based on a relationship defined as:

$$AMAT_r(o) = \mu_r(o)L_{\tau,r} + (1-\mu_r(o))L_{LLC}$$

where $\mu_r(o)$ is a number of read memory accesses made to the object (o) per load operation, $L_{\tau,r}$ is a latency to read a cache block in memory, and $L_{LLC}$ is a latency to access the cache;
   identifying a type of the object based on the AMAT, the type of the object comprising one of a hot object and a cold object; and
   allocating, by the one or more processors, the object to one of a first size of virtual memory page and a second size of virtual memory page of an operating system based on the type of the object to separate a hot object storage from a cold object storage to reduce a demand on the cache associated with the object.

2. The method of claim 1, wherein the type of the object comprises a hot object, and is allocated to the first size of virtual memory page, the first size of virtual memory page comprises a large virtual memory page that has a size of at least 1 MB.

3. The method of claim 2, further comprising allocating hot objects to the large virtual memory page until the large virtual memory page is full, then allocating hot objects to another large virtual memory page.

4. The method of claim 1, wherein the type of the object comprises a cold object, and is allocated to the second size type of virtual memory page, the second size of virtual memory page comprises a small virtual memory page that has a size smaller than 1 MB.

5. The method of claim 1, wherein determining the type of the object comprises comparing the AMAT to a threshold.

6. The method of claim 1, wherein the application comprises a first allocator function and a second allocator function to respectively allocate the object to one of the first size of virtual memory page and the second size of virtual memory page of the operating system based on the type of the object.

7. The method of claim 1, further comprising:
   receiving source code of the application;
   providing an instrumented application that includes the source code and instrumentation code, the instrumented application comprising at least one instruction for profiling a plurality of objects;
   executing the instrumented application to process a set of benchmark queries to provide a statistics file, the statistics file indicating, for each object in the plurality of object, respective memory allocations; and
   for each object in the plurality of objects, determining a respective type based on the respective memory allocations.

8. A non-transitory computer-readable storage medium coupled to one or more processors and having instructions stored thereon which, when executed by the one or more processors, cause the one or more processors to perform operations comprising:
   determining that an object implicated in an executing application is to be allocated to memory in an in-memory system;
   determining an average memory access time (AMAT) of the object based on a relationship defined as:

$$AMAT_r(o) = \mu_r(o)L_{\tau,r} + (1-\mu_r(o))L_{LLC}$$

where $\mu_r(o)$ is a number of read memory accesses made to the object (o) per load operation, $L_{\tau,r}$ is a latency to read a cache block in memory, and $L_{LLC}$ is a latency to access the cache;
   identifying a type of the object based on the AMAT, the type of the object comprising one of a hot object and a cold object; and allocating the object to one of a first size of virtual memory page and a second size of virtual memory page of an operating system based on the type of the object to separate a hot object storage from a cold object storage to reduce a demand on the cache associated with the object.

9. The computer-readable storage medium of claim 8, wherein the type of the object comprises a hot object, and is allocated to the first size of virtual memory page, the first size of virtual memory page comprises a large virtual memory page that has a size of at least 1 MB.

10. The computer-readable storage medium of claim 9, wherein operations further comprise allocating hot objects to the large virtual memory page until the large virtual memory page is full, then allocating hot objects to another large virtual memory page.

11. The computer-readable storage medium of claim 8, wherein the type of the object comprises a cold object, and is allocated to the second size type of virtual memory page, the second size of virtual memory page comprises a small virtual memory page that has a size smaller than 1 MB.

12. The computer-readable storage medium of claim 8, wherein determining the type of the object comparing the AMAT to a threshold.

13. The computer-readable storage medium of claim 8, wherein the application comprises a first allocator function and a second allocator function to respectively allocate the object to one of the first size of virtual memory page and the second size of virtual memory page of the operating system based on the type of the object.

14. The computer-readable storage medium of claim 8, wherein operations further comprise:
receiving source code of the application;
providing an instrumented application that includes the source code and instrumentation code, the instrumented application comprising at least one instruction for profiling a plurality of objects;
executing the instrumented application to process a set of benchmark queries to provide a statistics file, the statistics file indicating, for each object in the plurality of object, respective memory allocations; and
for each object in the plurality of objects, determining a respective type based on the respective memory allocations.

15. A system, comprising:
a computing device; and
a computer-readable storage device coupled to the computing device and having instructions stored thereon which, when executed by the computing device, cause the computing device to perform operations comprising:
determining that an object implicated in an executing application is to be allocated to memory in an in-memory system;
determining an average memory access time (AMAT) of the object based on a relationship defined as:

$$AMAT_\tau(o) = \mu_r(o) L_{\tau,r} + (1 - \mu_r(o)) L_{LLC}$$

where $\mu_r(o)$ is a number of read memory accesses made to the object (o) per load operation, $L_{\tau,r}$ is a latency to read a cache block in memory, and $L_{LLC}$ is a latency to access the cache;
identifying a type of the object based on the AMAT, the type of the object comprising one of a hot object and a cold object; and
allocating the object to one of a first size of virtual memory page and a second size of virtual memory page of an operating system based on the type of the object to separate a hot object storage from a cold object storage to reduce a demand on the cache associated with the object.

16. The system of claim 15, wherein the type of the object comprises a hot object, and is allocated to the first size of virtual memory page, the first size of virtual memory page comprises a large virtual memory page that has a size of at least 1 MB.

17. The system of claim 16, wherein operations further comprise allocating hot objects to the large virtual memory page until the large virtual memory page is full, then allocating hot objects to another large virtual memory page.

18. The system of claim 15, wherein the type of the object comprises a cold object, and is allocated to the second size type of virtual memory page, the second size of virtual memory page comprises a small virtual memory page that has a size smaller than 1 MB.

19. The system of claim 15, wherein determining the type of the object comprises comparing the AMAT to a threshold.

20. The system of claim 15, wherein the application comprises a first allocator function and a second allocator function to respectively allocate the object to one of the first size of virtual memory page and the second size of virtual memory page of the operating system based on the type of the object.

* * * * *